(12) United States Patent
Wilson-Jones et al.

(10) Patent No.: US 8,434,583 B2
(45) Date of Patent: May 7, 2013

(54) ELECTRIC POWER STEERING SYSTEM

(75) Inventors: Russell Wilson-Jones, Stratford-upon-Avon (GB); Birk Junghanns, Birmingham (GB); Timothy Sworn, Birmingham (GB); Geoffrey Tullener, Birmingham (GB)

(73) Assignee: TRW Limited, Solihull (GB)

( * ) Notice: Subject to any disclaimer, the term of this patent is extended or adjusted under 35 U.S.C. 154(b) by 0 days.

(21) Appl. No.: 13/087,899

(22) Filed: Apr. 15, 2011

(65) Prior Publication Data

US 2012/0006612 A1   Jan. 12, 2012

(30) Foreign Application Priority Data

Apr. 15, 2010   (GB) .................................. 1006290.9

(51) Int. Cl.
*B62D 5/04* (2006.01)
(52) U.S. Cl.
USPC ................. 180/443; 180/446; 701/41; 701/42
(58) Field of Classification Search .................. 180/443, 180/444, 446; 701/41, 42, 43
See application file for complete search history.

(56) References Cited

U.S. PATENT DOCUMENTS

| 4,869,334 | A | * | 9/1989 | Marumoto et al. ............ 180/446 |
| 5,198,981 | A | | 3/1993 | Collier-Hallman et al. |
| 2001/0053952 | A1 | | 12/2001 | Kodaka et al. |
| 2004/0193344 | A1 | * | 9/2004 | Suzuki ............................. 701/41 |

FOREIGN PATENT DOCUMENTS

| DE | 102008055873 A1 | 11/2009 |
| EP | 1316494 A1 | 6/2003 |
| EP | 1595767 A2 | 11/2005 |
| EP | 1679246 A2 | 7/2006 |
| EP | 1972524 A2 | 9/2008 |
| EP | 1995150 A2 | 11/2008 |

OTHER PUBLICATIONS

Search Report for GB1006290.9 dated Aug. 12, 2010.

* cited by examiner

*Primary Examiner* — Kevin Hurley
*Assistant Examiner* — Marc A Scharich
(74) *Attorney, Agent, or Firm* — MacMillan, Sobanski & Todd, LLC

(57) ABSTRACT

An electric power assisted steering system comprises a torque sensor, a motor connected to a part of the steering system to provide motor torque to the steering system and a motor controller which is adapted to receive an output signal from the torque sensor and to generate a motor torque demand signal indicative of the torque to be applied by the motor to the steering system. The motor torque demand signal comprises a driver demand component dependent upon the torque applied by the driver; and a diagnostic component independent of the torque applied by the driver and which varies in value over time in a predetermined manner. The system further comprises a monitor that correlates the diagnostic component with the output signal and generates a signal indicating that the output signal is faulty if the correlation falls outside of a predefined range.

18 Claims, 1 Drawing Sheet

ELECTRIC POWER STEERING SYSTEM

CROSS-REFERENCE TO RELATED APPLICATIONS

This application claims priority to Great Britain Application No. 1006290.9 filed Apr. 15, 2010, the disclosures of which are incorporated herein by reference in entirety.

BACKGROUND OF THE INVENTION

This invention relates to improvements in electric power assisted steering systems.

In an electric power assisted steering system, an electric motor is used to provide an assistance torque for the driver, reducing the effort required to steer the vehicle. The motor is connected to the steering system and applies a torque that is dependent on the torque applied to the handwheel of the steering system by the driver. This is typically measured using a torque sensor connected to the steering shaft which supports the handwheel. A motor controller receives the output signal from the torque sensor and from this produces a motor torque demand signal that is passed to a motor drive circuit which produces the motor currents needed to drive the motor.

To provide for enhanced levels of integrity in the system, it is also known to provide two output signals from the torque sensor, or even to provide two torque sensors which each provide a torque measurement. The two output signals are cross-checked to give a degree of confidence that the torque value indicated by the signals is correct. If there is a difference between the torques indicated by each of the two signals, then this indicates that the sensor signals cannot be trusted. In the prior art this has meant that the EPAS motor has to be disabled, leaving the driver with no assistance. At low speeds such as those used for parking (less than 5 miles per hour), it is very difficult to steer a modern vehicle without the power assistance provided by the motor. The vehicle is effectively disabled until the fault can be diagnosed and fixed by a service centre.

In many cases, only one output signal or "channel" of the sensor fails, so that one of the two output signals remains valid. In these cases, it would be desirable to continue to provide the steering assistance function (possibly with some degradation in steering performance) using the valid output signal. This would allow the driver to "limp home".

The applicant has appreciated that it is not always possible to identify with any confidence which channel of the sensor has failed and which one is correct. Moreover, if the remaining valid signal is used to control the assistance and it subsequently fails, then it may potentially give an incorrect signal to the EPAS controller, leading to an incorrect assistance torque. This is undesirable and is hard to detect as there is no longer an additional channel against which to perform a check. Therefore, the applicant has appreciated that it would be desirable to provide a further means of monitoring the torque sensor operation when there is a significant discrepancy between the torque indicated by the signals from each channel to determine which of the two channels (where provided) should be used in the limp-home mode, and to check that the channel being used in a "single-channel" operating mode is operating correctly.

BRIEF SUMMARY OF THE INVENTION

According to a first aspect, the invention provides an electric power assisted steering system comprising: a steering shaft which connects a handwheel through a steering gear to a pair of roadwheels; a torque sensing means producing at least one output signal indicative of the torque applied to the handwheel by the driver; a motor which is connected to a part of the steering assembly to provide an assistance torque to the steering assembly of the same sense as the torque applied by the driver to the handwheel in order to reduce the torque that the driver needs to apply to the handwheel to steer the vehicle; and a motor controller which is adapted to receive the at least one output signal and to generate a motor torque demand signal whose value is indicative of the torque to be applied by the motor to the steering system, the motor torque demand signal being formed from at least: a driver demand component with a value dependent upon the value of the handwheel torque applied by the driver; and a diagnostic component with a value independent of the handwheel torque applied by the driver and which varies in value over time in a predetermined manner; and in which the system further comprises: monitoring means for monitoring the at least one output signal to determine whether the output signal is indicative of a fault by correlating the diagnostic component of the torque demand signal with the output signal, the monitoring means generating a fault indicating signal indicating that the output signal is faulty if the correlation between the two signals falls outside of a predefined range.

The invention relies on the characteristic of such steering systems that the torque applied by the assistance motor can be partially detected by the torque sensor. For example, in steady-state, the sensor torque is approximately proportional to the difference between the load from the road wheels and the effect assistance force provided by the motor. In practice there are nonlinearities and other losses that can interfere with this effect that must be compensated for. The invention exploits this fundamental feature by deliberately introducing a perturbation in the motor torque by applying a diagnostic component that is detected in the torque sensor output signal. If the detected signal corresponds with the expected value, then it can be assumed that the sensor (and also the motor) is operating correctly; if not then this can be used to diagnose incorrect operation by generating a fault signal.

The motor torque demand signal may be the sum of (or difference between) the two components, or may be equal to the product of the two components. Indeed they may be combined in any way as long as the diagnostic component produces in the demand signal a perturbation that correlates to the diagnostic component.

The diagnostic component is preferably of relatively low amplitude, and should have an average amplitude of zero over time so that overall it does not cause the steering to tend to pull to the left or the right. Keeping the magnitude low prevents the driver from noticing that it is present as it will be effectively masked by noise and other artefacts such as vibration fed back from the road wheels to the handwheel.

The instantaneous value of the diagnostic component of the demand signal may be predetermined according to an algorithm which may be stored in memory of the system which is accessible to the motor controller. Alternatively, it may comprise a signal generated by a clock which is fed as an input to the controller.

The diagnostic component may be a sinusoidal signal. It may comprise two or more sinusoids which may have differing frequency, and/or differing phase and/or differing amplitude.

As an alternative, the diagnostic component may be a signal of any other periodic form: such as pulse, square, or sawtooth, or even a random or pseudo random sequence, such as a pseudo random binary sequence (PRBS). In one preferred approach, the diagnostic component comprises an impulse signal of alternating direction. The monitoring means may then be arranged to use a time-base correlation technique to estimate the gain and phase of the response, and compare this to the normal condition.

The diagnostic component which generates a perturbation in the motor torque may comprise two or more perturbations in parallel. For example the diagnostic component may comprise two sinusoids of different frequencies, and the monitoring means may be adapted to perform two separate correlations, and the judgement of whether the result indicates a fault may be made on the basis of one or both of the correlation signals being within the correct range.

The perturbation and/or correlation may be turned on and off so that there are periods when a check is being made and periods when it is not.

The judgement may be a continuous measure; this measure provides a "quality factor" for the sensor. If the quality factor is high, then the full assistance is provided. If the quality factor is low, then a reduced level or no assistance is provided.

The system may include a torque sensing means which generates a further output signal, the two output signals both being input to the motor controller to provide redundancy if one signal is faulty. Where there are two output signals from the torque sensing means the monitoring means may correlate both signals against the diagnostic component to identify any faulty signals.

Where two outputs signals are provided the monitoring means may monitor the integrity of both the output signals by comparing the two output signals. In the event that the two signals give different measurements of torque, an error signal indicating that at least one of the signals is faulty may be generated by the monitoring means.

The motor controller may apply the diagnostic component to the torque demand signal when the error signal has been generated (one or more signals faulty) and also when it has not (both signals correct).

In an alternative, the diagnostic component may only be applied to the motor by the motor controller at times when the error has been flagged by the monitoring means, in order to enable the monitoring means to determine which output signal is faulty.

In any event the motor controller may be arranged to apply a larger magnitude diagnostic component to the motor torque demand signal when it is known that one output signal is faulty than is applied when both output signals are known to be functioning correctly (in the case where two output signals are present). This provides a more accurate correlation to be performed (a large perturbation is easier to identify in the torque sensor output) and at a time when one sensor is failed it is less of a concern that the driver may be able to feel that this process is taking place.

The monitoring means may be arranged to perform the correlation analysis using a real-time algorithm that determines the low-order Fourier coefficients of the correlated signal. These can be used to determine the gain and phase relationship between the perturbation and the sensor output. If the gain and phase are within the expected ranges, then the monitoring means will make an "OK" judgement.

If the correlation identifies that one output signal is ok, even when a fault has been raised because the other output signal is faulty, the system may be arranged to continue to generate a motor torque demand component based upon the single non-faulty output signal.

When the steering system is not providing a large amount of power it is not potentially hazardous and so it is not necessary to run the diagnostic. In these cases the motor controller may not apply the diagnostic component to the motor torque demand signal, and no correlation may be performed on the output signal.

Therefore in a further improvement the diagnostic component may be applied to the motor torque demand signal only when the magnitude of the torque applied by the driver and/or the motor torque exceeds a threshold; this reduces the perturbations that are felt by the driver. Furthermore the correlation is poor when the motor torque is low because the output signal is masked by the friction in the steering system. The correlation may then only be performed at these high torques. At all other times a diagnostic component of zero value may be used at these times, or it may simply not be combined with the driver demand component at such times.

In a further modification, the motor control means may vary the amplitude of the diagnostic component in response to one or more characteristics of the operating condition of the steering system or the vehicle to which it is fitted. This allows the perturbation to be optimised at different operating conditions.

The optimum value of the diagnostic component is the minimum amplitude at which a good correlation measurement can be obtained, without being too disturbing to the driver. This amplitude variation may be influenced by a combination of one or more of the following parameters:
    Measured sensor torque
    Motor current or assist torque
    Vehicle speed
    Motor or handwheel velocity
    Steering angle
    Lateral acceleration The controller may therefore be arranged to receive as an input a measure of one or more of the motor current, the vehicle speed, the motor or handwheel velocity, the steering angle and the vehicle lateral acceleration. One or more of these inputs may be used to set the amplitude of the diagnostic component. The system may include one or more sensors suitable for providing these measurements, or the measurement may be obtained from sensors located elsewhere on the vehicle. A speed measurement could be obtained from a sensor that is provided as part of an anti-lock braking system of the vehicle.

The correlation analysis may be done in the frequency domain, or in the time domain (e.g. measuring an impulse response).

The diagnostic component and/or correlation may only operate when the sensor output is high and/or when the assistance level is high.

The motor controller may be arranged to adaptively vary the amplitude of the perturbation signal produced by the diagnostic component according to the size of the component measured by the sensor. This is may help the system to provide for variation in friction in the steering system, and to compensate for the nonlinearities in the motor controller.

It is preferred that the diagnostic provides an accurate diagnosis in a relatively short time. However the perturbation may be felt and/or heard by the driver. If the diagnostic is used as a primary detection method, then the perturbation period must be less than the maximum time allowed to detect the sensor fault. For a practical system design this will typically require a perturbation repetition rate of the order of 10 to 100 Hz. The detection time required depends on the size of the system, the nature of the failure and the vehicle chassis dynamic response. If combined with other diagnostics or limiting means (e.g. a slew rate limit), then a lower frequency range (1 to 20 Hz) may perhaps be used.

The frequency of the perturbation signal produced by the diagnostic component should be chosen so that it allows a clear identification of the transfer path between motor and sensor, and is not corrupted by resonances or other inputs to the steering mechanism.

The system may include a multiple phase electric motor and a motor drive circuit which receives as an input the torque control signal and is adapted to apply appropriate currents to each phase of the motor according to the value of torque demand signal to cause the motor to apply the appropriate torque.

The torque sensing means may comprise a torque sensor which measures the torque carried by the steering shaft to which the handwheel is attached. In one arrangement the shaft may include a section of reduced torsional rigidity and the torque sensor may produce a torque signal which is a function of the angular displacement between the ends of the section of reduced thickness. Such torque sensors are well known in the art.

In an alternative the torque sensing means may comprise two torque sensors, each producing one output signal indicative of torque. The two sensors may be completely independent so as to give a high degree of inbuilt redundancy.

The invention may also lie in a method of monitoring the integrity of a steering system.

Therefore, according to a second aspect the invention comprises a method of monitoring the integrity of an output signal from a torque sensing means in an electric power assisted steering system of the kind comprising a steering shaft which connects a handwheel through a steering gear to a pair of roadwheels of vehicle, a torque sensing means producing at least one output signal indicative of the torque carried by the steering shaft of the vehicle as a measure of the torque applied to the handwheel by the driver, a motor which is connected to a part of the steering assembly to provide an assistance torque to the steering assembly of the same sense as the torque applied by the driver to the handwheel so that the torque applied by the motor reduces the torque that the driver needs to apply to the handwheel to cause the roadwheels to turn; and a motor controller which is adapted to receive the output signal and is arranged to provide a torque demand signal to the motor whose value is indicative to the torque to be applied by the motor to the steering system, the method comprising the steps of: producing a torque demand signal formed from at least: a driver demand component with a value dependent upon the value of the handwheel torque applied by the driver; and a diagnostic component with a value independent of the handwheel torque applied by the driver and which varies in value over time in a predetermined manner; and monitoring the output signal of the torque sensing means to determine whether the output signal is faulty by correlating the diagnostic component of the torque demand signal with the output of the torque sensing means, and in the event that the correlation between the two signals falls outside of a predefined range generating an error signal indicating that the output signal is faulty.

Where the steering system includes a torque sensing means which produces two output signals, the method may comprise correlating each signal with the diagnostic component to determine the integrity of each output signal.

The method may comprise a step of comparing both output signals, and in the event that they indicate differing torques the method may use the results of the correlation to determine which of the two output signals is at fault.

In the event that one is faulty and the other is not, the method may comprise the step of issuing a warning that one signal is faulty.

In the event that both output signals are identified as faulty, the method may comprise the step of issuing a fault signal.

In the event that only one output signal is valid, the method may comprise limiting the performance of the vehicle to provide a limp home mode for example, by limiting the speed of the vehicle or limiting the available steering power assistance possibly based upon the vehicle speed.

Other advantages of this invention will become apparent to those skilled in the art from the following detailed description of the preferred embodiment, when read in light of the accompanying drawings.

DETAILED DESCRIPTION OF THE INVENTION

Figure 1:
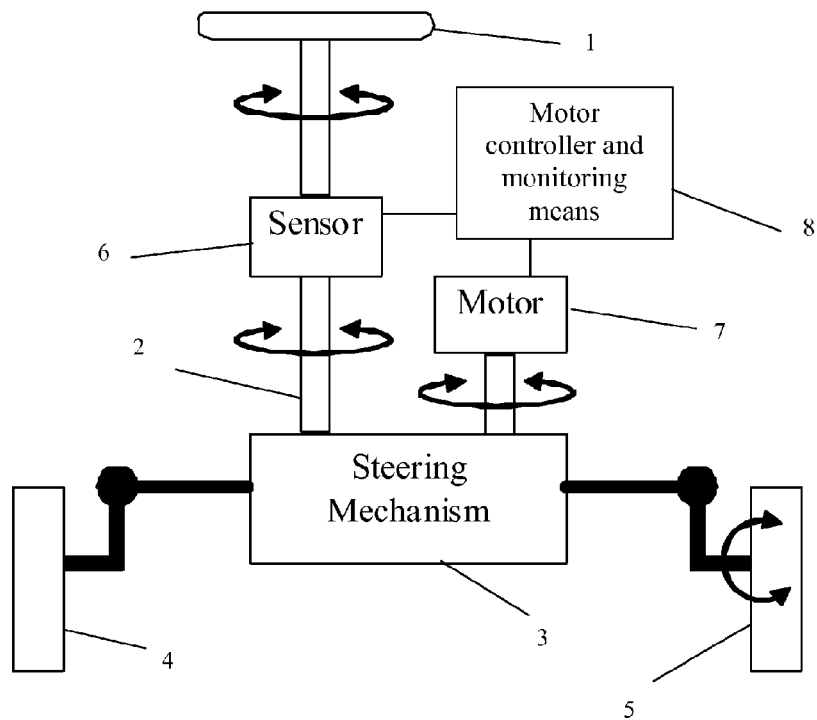
FIG. 1 is an overview of a key hardware components of steering system according to the present invention.

As shown in FIG. 1 an electric power assisted steering system comprises a handwheel 1 connected to an upper end of a steering shaft 2. The lower end of the steering shaft carries a pinion gear (not shown) which is connected to a steering rack forming part of a steering mechanism 3. The steering mechanism is connected to left and right roadwheels 4, 5 of the vehicle through steering arms. As the driver turns the handwheel 1 the steering shaft 2 rotates. The rack and pinion of the steering mechanism converts this rotation into linear displacement of the steering rack which produces a linear translation of the arms that causes the roadwheels 4, 5 to turn about their steering axis. Such an arrangement is very well known in the art, and many variations are possible. For instance, the steering gear could comprise a recirculating ball type arrangement rather than a rack and pinion.

The steering shaft 2 includes a section of reduced torsional rigidity known as a torsion bar or quill shaft, which separates the upper end of the shaft from the lower end. The provision of this section ensures a relatively large angular displacement of the upper and lower ends of the quill shaft when subject to torque applied to the handwheel by the driver. A torque sensor 6 is associated with the quill shaft and produces an output signal indicative of the torque carried by the steering shaft by measuring the relative angular positions of the upper and lower ends of the quill shaft. Of course, other types of torque sensor may be provided within the scope of the invention. Because the torque sensor measures the torque carried by the steering shaft 2, the output of the torque sensor 6 can be used as an indication of the torque demanded by the driver. An increased torque measurement indicates that the driver is applying a large turning force to the handwheel 1.

An electric motor 7 is provided which is connected to the steering mechanism (or alternatively to the shaft 2) through a further pinion. In this example, the motor 7 comprises a three phase electrically commutated sinusoidal AC brushless permanent magnet synchronous motor which comprises a rotor having, for example, six magnets mounted on it, which in this instance are arranged to provide six poles which alternate between north and south around the motor. A stator, in this example, comprises a nine slot copper wound element having three groups of three teeth, each group of teeth having a common winding forming a respective phase. The motor therefore passes through three complete electrical cycles on each full rotation of the rotor.

The three motor windings are connected in a star network. A delta network could be used. One end of each phase winding is connected to a respective terminal and the other ends of the three windings are connected together to form a star centre point. A drive circuit is provided which comprises a three phase bridge. Each phase of the bridge comprises a top arm including a top switching transistor, and a bottom arm including a bottom switching transistor. The top and bottom arms are connected at the one end of the respective phase winding, the other ends of each top arm being connected together to a supply rail, typically of 12 volts. The other ends of the bottom arms are connected together to a ground line that is connected to ground. Thus, each phase of the bridge comprises a top and bottom switch with the phase winding being tapped off between the two switches. The switches are turned on and off in a controlled pattern by a motor drive circuit to provide pulse width modulation (PWM) of the potential difference applied to each of the windings and hence the current flowing through the motor. This in turn controls the strength and orientation of the magnetic field and hence the torque and speed of the motor.

The motor drive circuit is controlled by a PWM controller, and this takes as an input an estimate of the position of the motor, and importantly a motor torque demand signal supplied by a motor controller 8.

Figure 2:
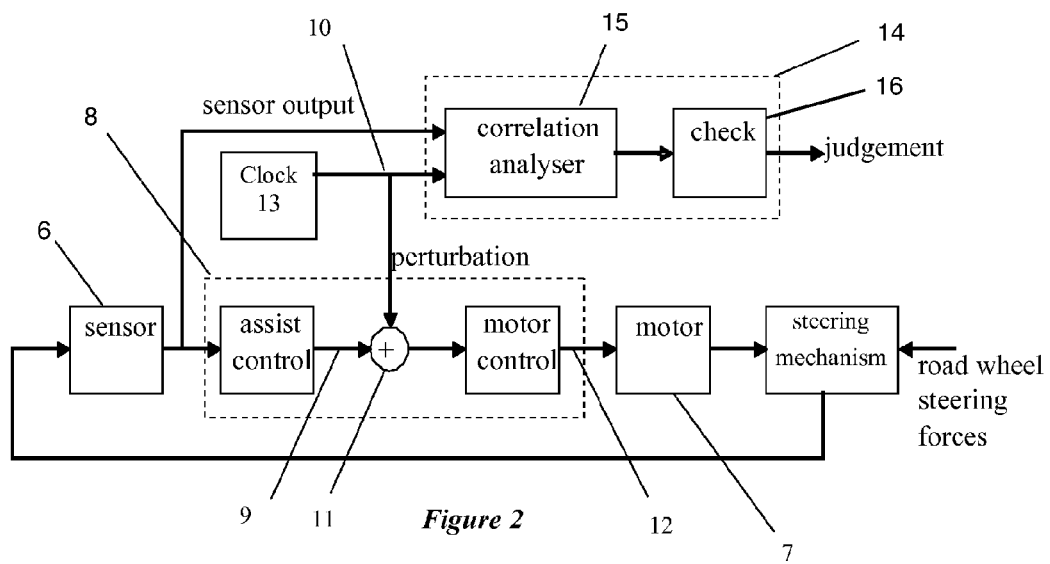
FIG. 2 is a more detailed schematic of the motor control circuitry and torque measurement and monitoring circuitry of the system of FIG. 1.

As illustrated in FIG. 2, the motor controller 8 receives as an input the output signal from the torque sensor 6. The motor controller 8 produces a motor torque demand signal which has at least two components. A first driver demand component 9 produced by an assistance control block is dependent upon the driver applied torque as indicated by the output signal from the torque sensor 6. A second component 10 is independent of the driver applied torque and is a diagnostic component. In essence this is a small amplitude time variant perturbation which is overlaid on the driver demand component 9. This perturbation enables the integrity of the system to be checked as will be described hereinafter. In this example, the two components 9, 10 are generated separately and added together to provide the motor torque demand signal 12 in a summation block 11. As shown in the example the diagnostic component is provided as a series of digital clock pulses output from a separate clock circuit 13, although a sinusoidal signal from a signal generator could be used if preferred.

The system includes a monitoring circuit 14 which receives as inputs the diagnostic component 10 and also the output signal from the torque sensor 6. The two signals are passed through a correlation analyser 15 and the result of the correlation is checked 16 and used to set the value of a fault signal. In particular if the correlation indicates that the perturbation cannot be identified in the output signal of the torque sensor 6 this indicates that either the torque sensor 6, the output signal or perhaps the motor 7 or motor controller 8 are faulty. A fault will then be indicated by the monitoring means.

It is preferred that the diagnostic provides an accurate diagnosis in a relatively short time. However the perturbation may be felt and/or heard by the driver. If the diagnostic is used as a primary detection method, then the perturbation period must be less than the maximum time allowed to detect the sensor fault; this will require a perturbation repetition rate of the order of 10 to 100 Hz. The detection time required depends on the size of the system and the vehicle chassis dynamic response. If the perturbation method is combined with other diagnostics or limiting means (e.g. a slew rate limit), then a lower frequency range (1 to 20 Hz) can be used.

The frequency of the perturbation signal 10 in this embodiment is chosen so that it allows a clear identification of the transfer path between motor and sensor, and is not corrupted by resonances or other inputs to the steering mechanism.

In this embodiment the diagnostic component 10 (perturbation signal) is correlated with the torque sensor output signal. The perturbation signal is a sinusoidal signal. The correlation analysis could be a real-time algorithm that determines the low-order Fourier coefficients. These can be used to determine the gain and phase relationship between the perturbation and the sensor output. If the gain and phase are within the expected ranges, then the Checking block will make an "OK" judgement. If the judgement is OK, then the system will continue to run with a single sensor channel; if it fails, then the sensor will be diagnosed to be "no good".

A good approach is to use an impulse signal of alternating direction. This then uses a time-base correlation technique to estimate the gain and phase of the response, and compare this to the normal condition.

When the steering system is not providing a large amount of power it is not potentially hazardous and so it is not necessary to run the diagnostic. In these cases the motor controller may not apply the diagnostic component to the motor torque demand signal, and no correlation may be performed on the output signal. Therefore optionally a further improvement can be made by only activating the perturbation when the magnitude of the sensor torque and/or the assistance torque exceeds a threshold; this reduces the perturbations that are felt by the driver.

Various modifications are possible within the scope of the present invention. For example, two output signals may be input to the controller, each giving a measurement of torque and being independent of the other. This provides a degree or redundancy. The monitoring means may then compare the torque values indicated by each signal and if they are different may generate an error signal indicating that one or both are faulty. When the error signal is generated, the monitoring means may thereafter perform the correlation against each of the two signals to check which of the two signals is faulty. If one is not faulty, this can be used by the controller to generate the motor torque demand signal whilst the other output signal is discarded. To reduce the risk of the driver feeling the perturbation signal the diagnostic component may either be omitted completely, or kept at zero value, until the monitoring means determines that one or both signals are faulty. Only then will the perturbation be applied and the correlation performed.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electric power assisted steering system comprising:
    a steering shaft which connects a handwheel through a steering gear to a pair of roadwheels of a vehicle;
    a torque sensor producing at least one output signal indicative of a torque applied to the handwheel by a driver;
    a motor which is connected to a part of the steering system to provide a motor torque to the steering system in order to reduce the torque that the driver needs to apply to the handwheel to steer the vehicle; and
    a motor controller which is adapted to receive the at least one output signal and to generate a motor torque demand signal whose value is indicative of the motor torque to be applied by the motor to the steering system, the motor torque demand signal being formed from at least:

a driver demand component with a value dependent upon the torque applied by the driver; and a diagnostic component with a value independent of the torque applied by the driver and which varies in value over time in a predetermined manner;

and in which the steering system further comprises:

a monitor for monitoring the at least one output signal to determine whether the at least one output signal is indicative of a fault by correlating the diagnostic component of the motor torque demand signal with the at least one output signal, the monitor generating a fault indicating signal indicating that the at least one output signal is faulty if the correlation between the diagnostic component of the motor torque demand signal and the at least one output signal falls outside of a predefined range.

2. An electric power assisted steering system according to claim 1 wherein the motor torque demand signal is one of the sum of the driver demand component and the diagnostic component and difference between the driver demand component and the diagnostic component.

3. An electric power assisted steering system according to claim 1 wherein the diagnostic component has an average amplitude of zero over time.

4. An electric power assisted steering system according to claim 1 wherein an instantaneous value of the diagnostic component of the motor torque demand signal is predetermined according to an algorithm stored in memory of the steering system which is accessible to the motor controller.

5. An electric power assisted steering system according to claim 1 wherein the diagnostic component is one of: a periodic waveform, a random sequence, and a pseudo random sequence.

6. An electric power assisted steering system according to claim 5 wherein the diagnostic component is one of: a pulse, a square and a sawtooth waveform signal.

7. An electric power assisted steering system according to claim 1 wherein the motor controller is adapted to turn off the diagnostic component so that there are periods when a correlation is being made and periods when a correlation is not being made.

8. An electric power assisted steering system according to claim 1 wherein the torque sensor generates a further output signal, the output signal and the further output signal being input to the motor controller to provide redundancy if one of the output signal and the further output signal is faulty and the monitor is arranged to correlate the output signal and the further output signal against the diagnostic component to identify a fault.

9. An electric power assisted steering system according to claim 8 wherein the monitor monitors integrity of both the output signal and the further output signal by comparing the output signal and the further output signal to each other.

10. An electric power assisted steering system according to claim 8 wherein the motor controller is arranged to increase a magnitude of the diagnostic component to the motor torque demand signal when it is determined that one of the output signal and the further output signal is faulty.

11. An electric power assisted steering system according to claim 1 wherein the diagnostic component is applied to the motor torque demand signal only when at least one of the torque applied by the driver and the motor torque exceeds a threshold magnitude.

12. An electric power assisted steering system according to claim 1 wherein the motor controller varies the diagnostic component in response to at least one characteristic of an operating condition of the steering system or of the vehicle.

13. An electric power assisted steering system according to claim 1 wherein the motor controller is arranged to adaptively vary the diagnostic component according to the output signal produced by the torque sensor.

14. An electric power assisted steering system according to claim 1 wherein the diagnostic component has a repetition rate of 10 to 100 Hz.

15. A method of monitoring an integrity of an output signal from a torque sensor in an electric power assisted steering system comprising a steering shaft which connects a handwheel through a steering gear to a pair of roadwheels of a vehicle, a torque sensor producing at least one output signal indicative of a torque applied to the handwheel by a driver, a motor which is connected to a part of said steering system to provide a motor torque to the steering system so that the motor torque applied by the motor reduces the torque that the driver needs to apply to the handwheel to cause the roadwheels to turn; and a motor controller which is adapted to receive the output signal and is arranged to provide a motor torque demand signal to the motor a value of which is indicative of the motor torque to be applied by the motor to the steering system, the method comprising the steps of:

producing a motor torque demand signal formed from at least:

a driver demand component with a value dependent upon the torque applied by the driver; and a diagnostic component with a value independent of said torque applied by the driver and which varies in value over time in a predetermined manner;

and monitoring the output signal of the torque sensor to determine whether the output signal is faulty by correlating the diagnostic component of the motor torque demand signal with the output signal of the torque sensor, and in the event that the correlation falls outside of a predefined range generating an error signal indicating that the output signal is faulty.

16. A method according to claim 15 where the steering system includes a torque sensor which produces two output signals, the method further comprising a step of correlating the two output signals with the diagnostic component to determine the integrity of the two output signals.

17. A method according to claim 16 which further comprises a step of comparing the two output signals to each other, and in the event that the two output signals differ, the method further comprises using the correlation to determine which of the two output signals is at fault.

18. A method according to claim 17 in which in the event that one of the two output signals is faulty and the other is not, the method further comprises the step of issuing a warning that one of the two output signals is faulty.

* * * * *